No. 657,428. Patented Sept. 4, 1900.
R. LIVINGSTON & W. RODGER.
MACHINE FOR MEASURING, MARKING, AND ROLLING CLOTH.
(Application filed Jan. 12, 1898.)
(No Model.) 5 Sheets—Sheet 1.
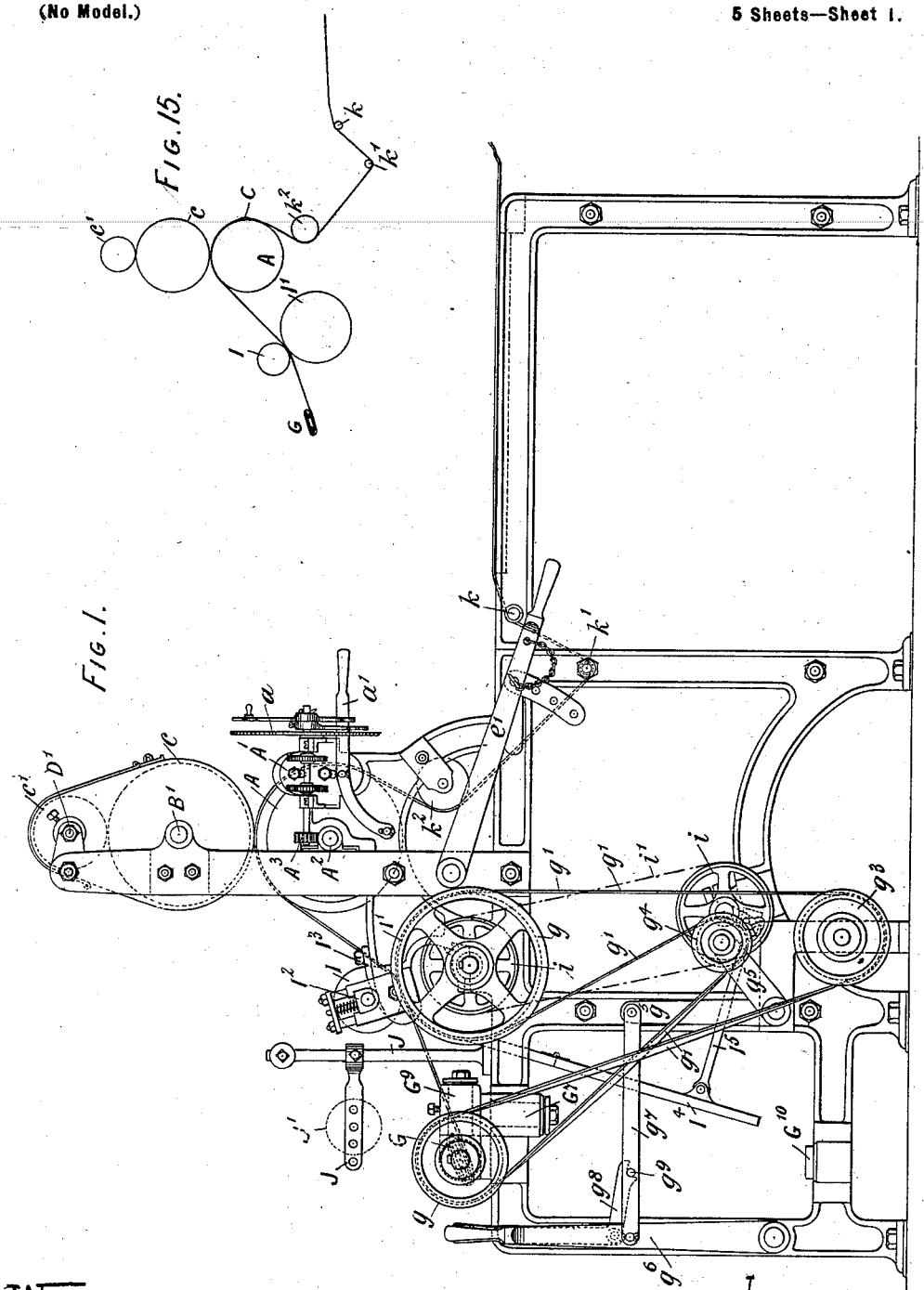
WITNESSES:
F. W. Wright.
S. C. Connor
INVENTORS
ROBERT LIVINGSTON
WILLIAM RODGER
BY Howson and Howson
THEIR ATTORNEYS.

No. 657,428. Patented Sept. 4, 1900.
R. LIVINGSTON & W. RODGER.
MACHINE FOR MEASURING, MARKING, AND ROLLING CLOTH.
(Application filed Jan. 12, 1898.)
(No Model.) 5 Sheets—Sheet 2.
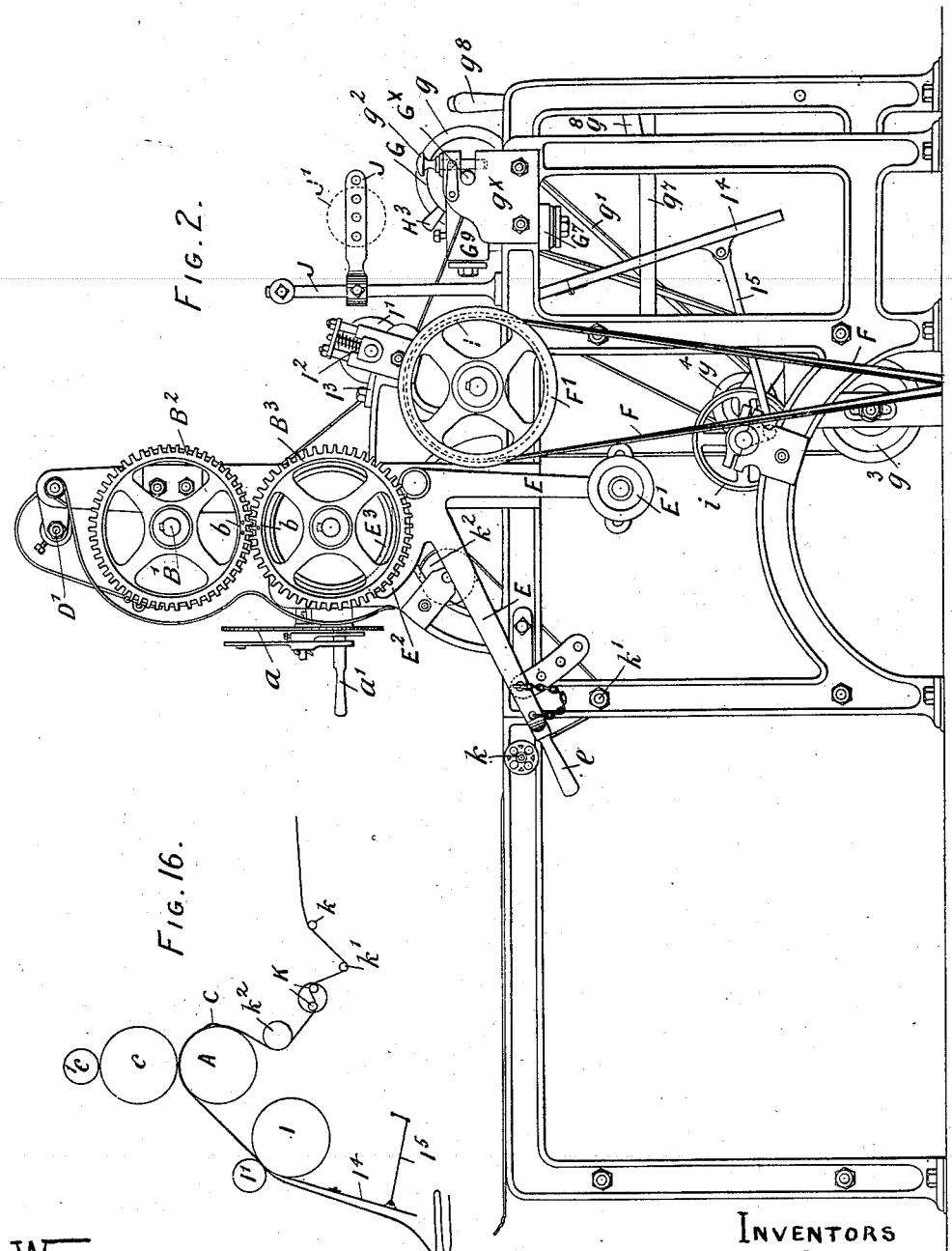
WITNESSES:
P. W. Wright
S. C. Connor
INVENTORS
ROBERT LIVINGSTON
WILLIAM RODGER
BY Howson and Howson
THEIR ATTORNEYS.

No. 657,428. Patented Sept. 4, 1900.
R. LIVINGSTON & W. RODGER.
MACHINE FOR MEASURING, MARKING, AND ROLLING CLOTH.
(Application filed Jan. 12, 1898.)
(No Model.) 5 Sheets—Sheet 3.
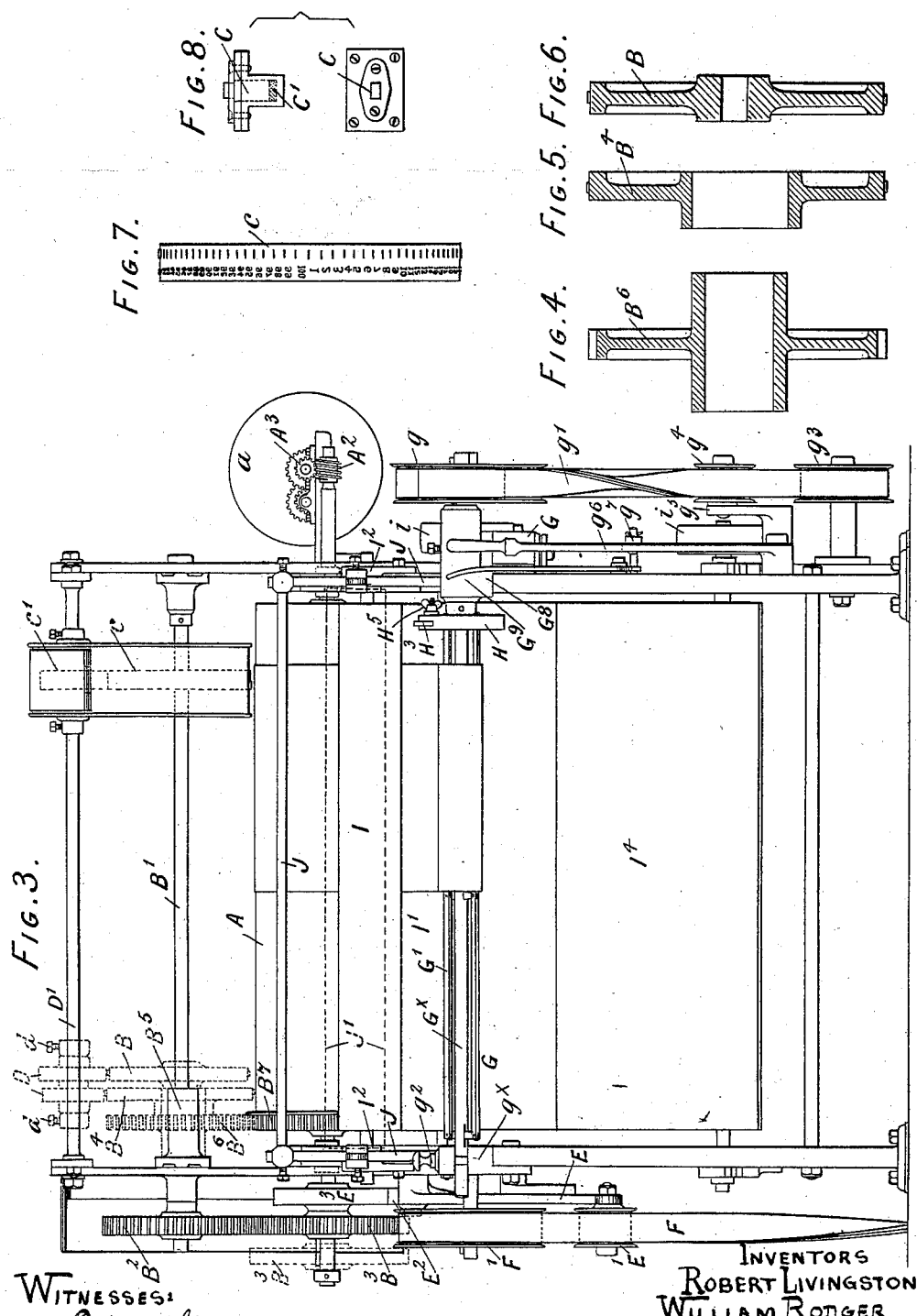
WITNESSES:
F.W. Wright.
S.C. Connor
INVENTORS
ROBERT LIVINGSTON
WILLIAM RODGER
BY Howson and Howson
THEIR ATTORNEYS No. 657,428. Patented Sept. 4, 1900.
R. LIVINGSTON & W. RODGER.
MACHINE FOR MEASURING, MARKING, AND ROLLING CLOTH.
(Application filed Jan. 12, 1898.)
(No Model.) 5 Sheets—Sheet 4.
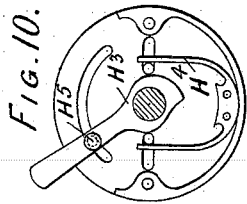
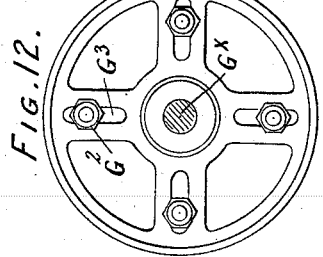
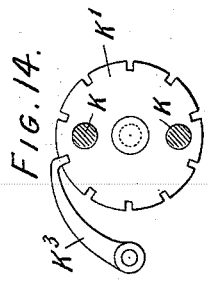
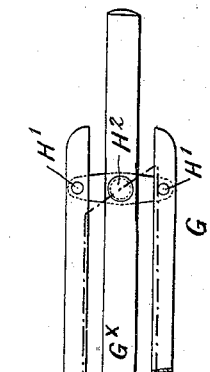
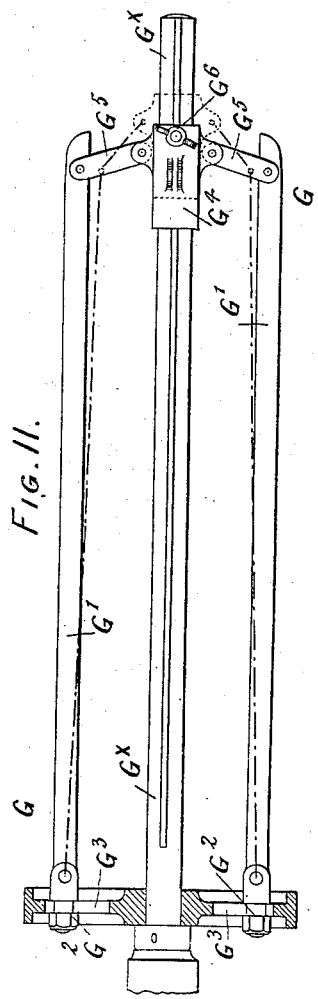
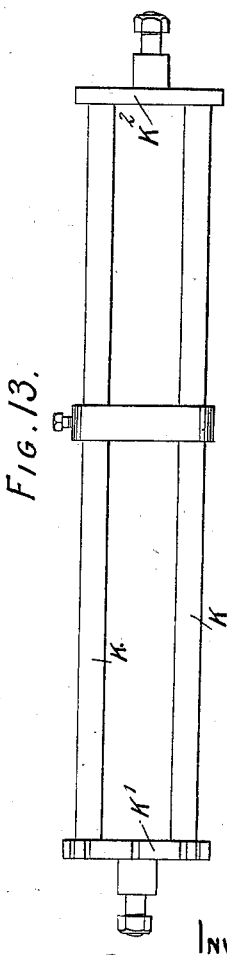
WITNESSES:
F. W. Wright
S. C. Connor
INVENTORS
ROBERT LIVINGSTON
WILLIAM RODGER
BY Howson and Howson
THEIR ATTORNEYS.

No. 657,428. Patented Sept. 4, 1900.
R. LIVINGSTON & W. RODGER.
MACHINE FOR MEASURING, MARKING, AND ROLLING CLOTH.
(Application filed Jan. 12, 1898.)
(No Model.) 5 Sheets—Sheet 5.
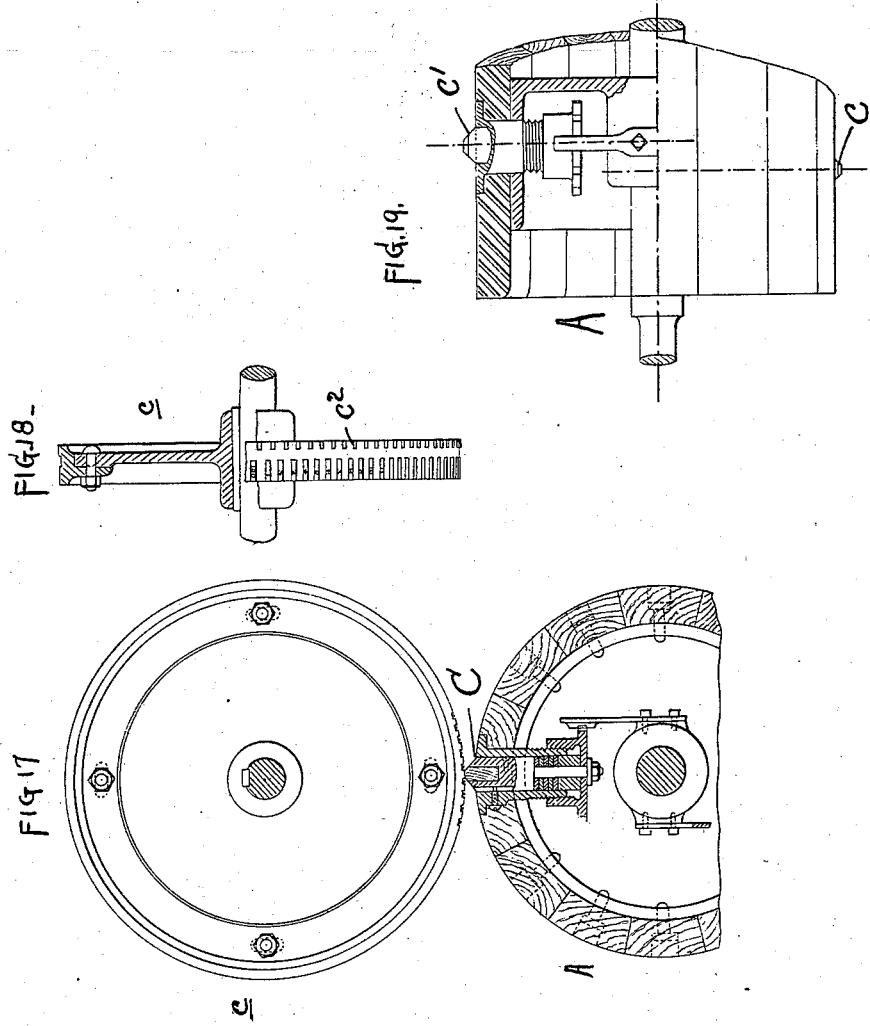
WITNESSES:
P. W. Wright
Chas. A. Peard
INVENTORS
ROBERT LIVINGSTON
WILLIAM RODGER
BY Howson and Howson
THEIR ATTORNEYS

UNITED STATES PATENT OFFICE.

ROBERT LIVINGSTON AND WILLIAM RODGER, OF DYSART, SCOTLAND, ASSIGNORS TO SAID LIVINGSTON, WILLIAM JOHN NORMAND, OF EDINBURGH, AND PATRICK HILL NORMAND, OF ABERDOUR, SCOTLAND.

MACHINE FOR MEASURING, MARKING, AND ROLLING CLOTH.

SPECIFICATION forming part of Letters Patent No. 657,428, dated September 4, 1900.

Application filed January 12, 1898. Serial No. 666,427. (No model.)

*To all whom it may concern:*

Be it known that we, ROBERT LIVINGSTON and WILLIAM RODGER, subjects of the Queen of Great Britain and Ireland, and residents of Dysart, county of Fife, Scotland, have invented certain new and useful Improvements in and Relating to Machinery for Measuring, Marking, and Rolling Cloth, of which the following is a specification.

This invention has reference to an improved construction of machine for measuring, marking, and rolling cloth.

The improved machine essentially consists in an improved combination of mechanism for measuring, marking, and rolling cloth comprising a covered measuring-roller, type-carrying wheels, a disk-wheel carrying numerals for fractions of a yard, brake mechanism, an adjustable cloth-winding reel, and tension devices.

In order to enable others skilled in the art to which our invention relates to understand how same may be carried into practice, we have hereunto appended explanatory drawings, in which the same letters of reference are used to indicate corresponding parts in the several figures where shown.

Figure 1 is a side elevation of a machine as constructed in accordance with our improvements, said figure looking from the starting side of the machine. Fig. 2 is a corresponding view looking from the driving side of the machine. Fig. 3 is an end elevation corresponding to these figures. Figs. 4, 5, and 6 are views of wheels used for marking the component parts of a yard, and Fig. 7 is a detached edge view of a single wheel for marking yards and half-yards. Fig. 8 shows elevation and plan detached views of the pressure-pad that is fixed to the covered roller. Fig. 9 is a plan view of a simple form of reel on which the cloth is rolled. Fig. 10 is a view of the actuating end of same, while Fig. 11 is a view of a form of reel used for the larger classes of goods, and Fig. 12 is a view of the adjusting end of same. Fig. 13 is a plan view of tension device, and Fig. 14 shows the actuating-pawl and toothed disk attached to same. Figs. 15 and 16 are diagram views showing how the movements are applied. Fig. 17 represents the type-wheel and the built-up roller with the stamping-pad, this roller being shown in section and partly cut away. Fig. 18 is a side view, partly in section, of the type-wheel. Fig. 19 represents a side view of part of the built-up roller, partly in section, showing the positions of the yard and half-yard pads. Fig. 20 represents the dial for indicating the length of cloth measured in the machine.

Referring to the drawings, the motion for the marking and measuring mechanism is conveyed from the driving-pulley F' and the drawing-roller I' on the same shaft with the driving-pulley to the wood-covered roller A by the cloth itself—that is, the cloth is passed between the drawing-rollers I I' and then onto the reel G, there being sufficient tension between the rollers I I' to pull the cloth through, thus causing the roller A to revolve. The reel G is driven from the driving-pulley F' by means of the pulleys and belts $g$ $g'$. Figs. 15 and 16 show diagrammatically the travel of the cloth and relative positions of the parts. A frame A' carries a train of wheels with dial and pointer, which wheels are driven by means of the worm $A^2$ on one end of the shaft of the roller A engaging with worm-wheel $A^3$ of the train of wheels for indicating the length of cloth passed through the machine.

For the purpose of indicating the number of yards passing through the machine a counter of ordinary construction may be used (see Fig. 20) with dial $a$, having graduated divisions on same marked from "0" to "100," a pointer indicating the numbers to the attendant. The frame A', with the counter mechanism, is made to lift out of gear by a handle $a'$, so as to bring the worm-wheel $A^3$ out of gear with the worm $A^2$, which is on the shaft of wood-covered roller A, to permit the wheels $B^2$ and $B^3$ being brought around to zero again, and the frame A' is then lowered to its former position. A type-wheel $c$ is mounted on a shaft B', placed parallel over covered roller A, said shaft B' being driven by suitable wheel-gear $B^2$ $B^3$ to give the required speed on types. This wheel $c$, Figs. 17 and 18, is divided into one hundred equal parts, into which numerals are cast or secured. Engaging with these numerals at every revolution of the covered roller A, which is exactly one yard in circumference, is a projecting pad C, (shown separately in Fig. 8,) securely fixed on the covered roller A, Figs. 17 and 19, and between which and the numerals the cloth is compressed sufficiently to leave the impression of the figures clearly at the end of each yard. The fractions of a yard are marked by means of marks, configurations, or numerals, as indicated at $c^2$, Fig. 18, a separate pad C', Fig. 19, being placed in the proper relative position on the covered yard-roller A for every fraction used. After each piece of cloth or other material has been run through the machine it is necessary to reset the type-wheel, and for this purpose the toothed wheel $B^3$ is fitted on a feather on the end of the shaft of the covered roller, so that it can be moved forward on the shaft to take it out of gear from wheel $B^2$, as shown in dotted lines, Fig. 3, and as much as will enable the operator to turn the wheel $B^2$ to the position shown in Fig. 2, and to insure this being done accurately marks or points, as shown at $b\ b$, Fig. 2, are impressed on same to indicate the position necessary for each fresh start. The ink supply to the type-wheel is given off gradually by a circular pad $c'$, free to revolve on a shaft D' on a bracket $D^2$ above the type-wheel. This pad $c'$ is made adjustable by a collar $c^3$ and set-screws $c^4$. A bell-crank lever E, with loose pulley E' on its end, is fitted to secure an instantaneous release of driving-belt F, which actuates the machine through the pulley F' on the shaft of the wood-covered drawing-roller I', and this lever E is also fitted with a horn $E^2$, utilized to effectively brake the covered roller A, on the arbor of which a brake-wheel $E^3$ is keyed, so that the attendant has the cloth entirely under control when nearing the end of the piece. The lever E is fitted with handles $e\ e'$, so that the same may be operated from either end of the machine.

When goods of the larger class are to be measured or marked, a reel G (shown detached in Figs. 11 and 12) is placed parallel to and at a lower level than the covered roller A, and this reel is formed with arms G', extended nearly the full breadth of the machine. This reel G is driven by pulleys $g$ and belts $g'$ from the end of the drawing-roller A. This reel G has been constructed with these radial arms G' for two reasons: first, as a ready means of adjusting at a moment's notice the diameter of reel that may be required to suit goods to be rolled. This is accomplished by slackening nuts $G^2$ of joint-pieces at disk end of reel and fixing to size wanted, oblong slots $G^3$ being provided for this purpose, for each arm G', and by a sliding brass bush $G^4$ with suitable lug-pieces, and from these lug-pieces to the arms G' radial connecting-links $G^5$ are secured. By moving or sliding this brass piece along the shaft $G^\times$ the arms G' are extended and compressed at will, and to secure arms in any position small set-screws $G^6$ have only to be tightened up. After the cloth is rolled on the reel these small set-screws $G^6$ are slackened, when the weight of cloth is sufficient to compress arms G' and push the brass bush along the shaft. The reel then takes a cone-shaped form and makes it perfectly easy for the operator to remove the cloth. Before the operator does so, however, a small cotter-pin $g^2$, Figs. 2 and 3, is withdrawn, and the reel turning around on the pivot $G^7$ to a suitable position it is then clear of the frame of the machine and the cloth can be readily removed. A small rest $G^8$ is fitted below the disk to support the weight of cloth and reel when withdrawn from the frame. When not in use, the reel can be (to economize floor-space) turned upright on pivot $G^9$ and firmly secured in a position on block $G^{10}$ at the lower end of the frame, and it is then out of the way for the other operations.

In the arrangement of reel shown in Figs. 1 to 3 and 9 and 10, which enables the operator to finish the cloth to a small diameter of roll, the one end of the arms G' is mounted within a disk-shaped piece H and has a bevel-shaped head, and the other end of the arms G' is secured to a link H', which is fulcrumed at its center $H^2$ within a slot in the shaft $G^\times$, and the arms are brought to the position indicated in dotted lines by a cam-shaped lever $H^3$, Fig. 10, acting on the arms G', normally pressed inward by a bow-shaped spring $H^4$, the lever $H^3$ being secured in either position by a thumb-screw $H^5$.

In order to enable the reel G to be moved and swung freely, the belt $g'$ has been arranged to run over a guide-pulley $g^3$ and a stenting-pulley $g^4$. This stenting-pulley $g^4$ is run on a stud carried on a bell-crank lever $g^5$, which is in turn connected to the set-handle $g^6$ by a link $g^7$, provision being made to lock it by a lever $g^8$ and pin $g^9$ on the connecting-link $g^7$. This arrangement prevents the reel G when swung out of the end bush $g^\times$ from being put in motion when the cloth is in the process of removal.

When running goods through the machine intended for "lapping-machines" and the like, drawing-rollers I I' are fitted, the under one, I', being covered with wood in a similar manner to the roller A, as shown in Fig. 17, and the upper roller I is formed of heavy metal and mounted in adjustable bearings $I^2$. When intended for use, the wedges $I^3$ are raised out of position, so as to allow the top roller I to fall forward, and thus draw the cloth, which can be folded in the usual manner by a folder. When folded cloth is being passed through the machine, it is advisable to mount on an adjustable bracket J a wooden roller J', having spikes on same to keep the cloth in position when being run onto the reel, and thus prevent crease.

In Figs. 1 to 3 the cloth is shown as being led through the machine for marking and reeling over a tension-rod $k$, around one of the stays $k'$ of the machine, and then onto an auxiliary guide-roller $k^2$, and thence around the roller A, and then between the drawing-rollers I I², and finally onto the reel G. When the drawing-rollers I I' are used, Fig. 16, a tension device, as shown in Figs. 13 and 14, is fitted between the tension-rod $k$ and the guide-roller $k^2$ and consists of a pair of parallel bars K, fitted between end disks K' K², one of the disks K' being formed with serrations into which a pawl K³ works to regulate the degree of tension on the different qualities of cloth.

The diagrams Figs. 15 and 16 show two of the principal ways of passing the cloth through the machine.

The operation of the machine is as follows: A piece of cloth is taken and led by the attendant over the tension-rod $k$, under the tension-rod $k'$, under tension-roller $k^2$, and thence around covered roller A, then between the drawing-roller I and covered roller I' to the reel G', where it is wrapped around the same, say, two turns. The one attendant then sets the wheels B² B³ to the mark $b\ b$ and then starts the machine by stenting the belt F, while the other attendant at the entering end of the machine stents the belt $g'$ at that side, locking a handle by the bell-crank lever $g^8$, when the piece is run through the machine, the yards being indicated on the dial $a$, as before described.

We claim as our invention—

1. In a machine for measuring and marking cloth, the combination of a measuring-roller, driven by the cloth drawn through the machine, and provided with projecting pads, and drawing-rollers, with a numbering-wheel having a series of type around its periphery, the said numbering-wheel being geared to and driven by said measuring-roller, and means for permitting the movement of the gear of the measuring-roller out of engagement with the gear of the numbering-wheel, substantially as described.

2. In a machine for measuring, marking and rolling cloth, the combination of a measuring-roller provided with pads, an indexing device operated by said roller and a numbering-wheel geared to and driven by said measuring-roller, and having a series of type around its periphery, mechanism for disengaging the indexing device from the measuring-roller and for disengaging the measuring-roller gear from the numbering-wheel gear, the said indexing device and the said numbering-wheel being adapted to be returned to zero when disengaged, with drawing-rollers, and a winding-reel, substantially as described.

3. In a machine for measuring and marking cloth, the combination of a measuring-roller, rotated by the cloth moving through the machine and provided with a brake-wheel, a driving-belt, a bell-crank lever carrying a loose pulley to act upon said driving-belt and provided with a horn to act upon the brake-wheel of the said measuring-roller, a numbering-wheel geared to and driven by said measuring-roller, and means for permitting the disengagement of the gear of the measuring-wheel from the gear of the numbering-wheel, substantially as described.

4. In a machine for measuring, marking and rolling cloth, the combination of the reel adapted to fold upward or swing outward, a pulley, and driving-belt therefor, and means for preventing the motion of the reel when out of its normal working position, said means comprising a stenting-pulley, with a bell-crank lever carrying the said stenting-pulley, a set-handle, a link connecting the said handle and the bell-crank lever, a pin on said link and a locking-lever engaging the said pin, substantially as set forth.

In testimony whereof we have signed our names to this specification in the presence of two subscribing witnesses.

ROBT. LIVINGSTON.
WM. RODGER.

Witnesses:
THOMAS AITKEN,
JAMES CLARK.